United States Patent [19]
Altmeier

[11] Patent Number: 5,936,004
[45] Date of Patent: *Aug. 10, 1999

[54] STRONGLY BASIC ANION-EXCHANGING MOLDED BODIES AND A METHOD OF MANUFACTURING THE SAME

[76] Inventor: Patrick Altmeier, Donatusstrasse 43, 66822 Lebach, Germany

[ * ] Notice: This patent is subject to a terminal disclaimer.

[21] Appl. No.: 08/913,117

[22] PCT Filed: Feb. 29, 1996

[86] PCT No.: PCT/EP96/00825

§ 371 Date: Aug. 14, 1997

§ 102(e) Date: Aug. 14, 1997

[87] PCT Pub. No.: WO96/26971

PCT Pub. Date: Sep. 6, 1996

[30] Foreign Application Priority Data

Mar. 1, 1995 [DE] Germany ............................. 19507104

[51] Int. Cl.$^6$ .................................. C08J 5/20; C08J 5/22
[52] U.S. Cl. ................................ 521/32; 521/25; 521/27; 521/30; 521/34; 525/381; 525/382
[58] Field of Search ................................. 521/27, 32, 30, 521/25, 34; 525/382, 381; 210/500.37

[56] References Cited

U.S. PATENT DOCUMENTS

| | | |
|---|---|---|
| 2,862,894 | 12/1958 | Hwa . |
| 2,898,310 | 8/1959 | Greer . |
| 5,137,925 | 8/1992 | Hodgdon . |
| 5,746,917 | 5/1998 | Altmeier ............................ 210/500.37 |

FOREIGN PATENT DOCUMENTS

| | | |
|---|---|---|
| 1274572 | 9/1961 | France . |
| 1 020 600 | 12/1957 | Germany . |
| 40 26 154 A1 | 2/1992 | Germany . |
| 43 28 226 A1 | 3/1995 | Germany . |

*Primary Examiner*—Fred Zitomer
*Attorney, Agent, or Firm*—Henry M. Feiereisen

[57] ABSTRACT

Anion-exchanging molded bodies and a method of manufacturing the same. The aim is to find anion-exchangers which can be produced in any shape simply, cheaply and reproducibly, without the use of carcinogenic chloromethyl ethers. It has been established that halogenated polyethers, preferably epichlorhydrin polymers, can be treated with tertiary amines together with inert polymers to produce such anion-exchanging molded bodies by a phase-inversion process or evaporation of the solvent. These molded bodies can be in the form of blocks, balls or films.

9 Claims, No Drawings

5,936,004

STRONGLY BASIC ANION-EXCHANGING MOLDED BODIES AND A METHOD OF MANUFACTURING THE SAME

FIELD OF THE INVENTION

The invention refers to new strongly alkaline ion exchanging molded bodies and a method of manufacturing the same. These anion exchangers consist of a polymer system which allows due to its special possibility of processing and its mechanic properties to produce fibers, mats, compact bodies, balls and so on.

Ion exchangers are used to exchange ions in solutions. Furthermore they are used in electrophoresis and ion chromatography as supporting material. As foils they are purchased as ion exchange membranes.

DESCRIPTION OF THE PRIOR ART

To date, anion exchangers are mainly made on the basis of copolymers of styrene.

Apart from styrene, polysulfones, polyether sulfones or poly (vinylpyridine) derivatives can also be used as a matrix polymer. These materials have the drawback that their design as thin flexible layers or compact bodies is difficult. In addition, very toxic chloromethyl-methyl ethers must mostly be used to produce these polymers.

Moreover there are anion exchangers (e.g. DD 301 541) containing alkylidene epoxides bound on the basis of polyvinyl alcohol, which result from the reaction of epichlorhydrin with secondary or tertiary amines. These anion exchangers can only be produced as balls. Furthermore the chemical stability against acids and bases is unsatisfactory because of the contents of the polyhydroxylated polymers.

Therefore the use of polyepichlorhydrin as base polymer is very advantageous because a highly chemical stability can be expected. A survey of the state of the art can be found e.g. in Advances in Polymer Science 70 (1985), Key Polymers p. 92 f. Using this base polymer system the problem arises that only weakly basic anion exchangers can be manufactured. This problem is also clearly visible in the production of similarly built polyelectrolytes from polyepichlorhydrin and tertiary amines where the reaction is limited on oligomeric polyepichlorhydrin.

From DE 4328226, there are known anion exchange membranes on the basis of products from the reaction of polyepichlorhydrin and tertiary amines. These membranes, however, can only be produced as thick and compact films. It's impossible to produce shaped bodies or very thin films used as separation layers.

SUMMARY OF THE INVENTION

It is an object of this invention to provide a generally usable strongly alkaline basic anion exchanger
1. which can be produced in different physical forms (e.g. block form; as film on supporting materials; as adhesive).
2. is strongly alkaline without the use of any toxic chloromethylating substance.
3. is chemically stable (especially against high and low pH-values and against oxidation agents)
4. whose mechanical stability is satisfactory, and
5. is easy and inexpensive to produce.

It was found that it is possible to transform a special solution into a solid anion exchanger through different procedures, so that a lot of solid bodies can be produced. This solution contains reaction products of polyepichlorhydrin with tertiary amines, especially 1,4-diazabicyclo-(2,2,2)-octane in dipolar aprotic solvents, if necessary with suitable inert polymers and/or softeners.

The use of the components of this invention thus surprisingly solves the well known problems for the production of solid bodies out of ion exchange polymers, as the polymer system, according to the invention, can be manufactured by different methods.

At first there is the possibility to fill a casting mold with the solution and to evaporate the solvent afterwards. This method restricts itself to the production of large size flat bodies e.g. mats or fibers, which have no sticking up contours from the surface. It can be extended on bodies with a structure on the surface, if softeners are added to the solution which fill the volume of the later incorporated water. To produce compact thick bodies the solution can be made solid by means of an according coagulant. The best method to do that is to fill the solution in a casting mold and to overlay it with the coagulant. During a certain time the coagulant diffuses in the body and makes it solid. It is possible to add a crosslinking agent to the coagulant, e.g. primary amines, or the active polymer is crosslinked by heat in a further step.

Finally the casting solution can be sprayed as a very thin film on a supporting material so that the ion exchanger can serve as a semipermeable layer. Through these shaping possibilities there is a wide range of use: the material can especially be used as support in the gel-electrophoresis, as diaphragm in fuel cells, in the form of napped mats, as ion-conducting spacer for the electrodialysis, as a separating layer for gas and liquids and as an ion conducting adhesive. In addition there has been found that the above mentioned reacting products posses quite new separating properties and therefore can be used as separating material in the gas separation and pervaporation.

DESCRIPTION OF THE INVENTION

The nature of the ion exchangers of the present invention is determined by the possibilities of shape giving, which arise from the combination of the reactive halogen containing polyether and the inert polymer with the amine component. The reactive component has the general formula

wherein at least one of the residues $R_1$–$R_4$ is a $CH_2Z$ group with Z=halogen. These are polymers of epihalohydrines, of 1,4-dichlor-2,3-epoxibutane or copolymers of the both or co- or terpolymers together with ethylene oxide. Because of the technical availability of high molecular polyepichlorhydrin respective copolymers of epichlorhydrin and ethylene oxide respective terpolymers of epichlorhydrin, they are used favorable. Epibromhydrin and epiiodhydrin can also be used although they are very expensive. Furthermore polymers, e.g. polyvinyl alcohol, can be used on which active polymers of the said form are grafted.

The reactive component according to the present invention meets different fundamental preconditions: It is industrially easily available and the production does not require chloromethylation as process step. It is inexpensive, of pure aliphatic structure so that materials resulting therefrom do not have a tendency for pollution, and can be used with such inert polymers that are unsuitable for use with other basic polymers. Furthermore, the halogenated polymers according to the present invention have a significantly smaller molar mass of the monomer unit compared with chloromethylated polystyrenes or polysulfones. The attainable fixed ion concentrations in the materials are significantly higher because there are more reactive groups per gram polymer.

Beside these favorable aspects, the main further difference of the used reactive polymer compared to other reactive polymers is its lower reactivity towards tertiary amines. Tertiary amines react with organic halogen compounds to a chemical uniform quaternary ammonium salt. Diamines can react with both amino groups at different molecules so that crosslinking and formation of the quaternary ammonium ions is possible at the same time, if a polymeric halogen compound is used. It is therefore advantageous without any limitation of the invention to use tertiary diamines for quaternization and simultaneous crosslinking of the polymers used according to the invention. The physical properties of the amines must also be adjusted to the process. To produce a membrane easily, it has to be possible to bound both the amine and the polyether together in the casting solution. Trimethylamine is a gas at standard conditions and thus can not be used in such a process. The choice of the according amine and perhaps of the inert polymer gains therefore a key-function as—through the above mentioned causes—the amine has a decisive influence on the suitable processing of the solution.

When using polymers according to the present invention, a certain reaction time must be taken into consideration for the quaternization of the amine in order to ensure that the amine does not evaporate with the solvent used. This is attained in a simple manner by limiting the steam volume over the film during evaporation or by adding a certain excess of amine. The use according to the invention of 1,4-diazabicyclo-(2,2,2)-octane as amine component is particularly advantageous because the chemical and physical limiting conditions are met in an ideal manner and the substance is significantly activated for the quaternization of the first nitrogen atom. On the other hand, the above mentioned steps are essential during the reaction and evaporation of the solvent especially when using this amine for receiving good ion exchangers because this amine has a strong tendency to evaporate with the solvent, especially DMF. It has also been found advantageous to pre-react the casting solution at elevated temperature, mainly 80–120° C. This results in an approximately 10 to 20% pre-substitution, without encountering a crosslinking of the polymer in the solution. It is possible, however, to carry out the substitution almost completely in advance by protecting in the di- or polyamine each amino group that exceeds one or by adding the amine in a appropriate excess. Furthermore a possibly crosslinked material which has a relatively high degree of presubstitution can be liquefied again with a ultraturrax mixer. Thus it is attained that the active polymer reacts with he amine component. This is especially important if it is desired to produce a body by phase inversion in combination with the use of an inert polymer or to get a film on a supporting material which is sensitive to temperature.

This polymer changed in such a manner represents a substance of its own. From a substitution degree of about 10% this polymer is soluble in water. Through an excess of the amine component, a non crosslinked, soluble material can be produced which is substituted up to 60% and can be precipitated and purified with acetone. The polymer contains two components in a statistical distribution and can schematically be designed as follows:

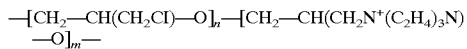

It is bifunctional as it contains besides the original chloromethylene groups quaternary ammonium ions which can react both intramolecularly and intermolecularly over the tertiary amine functions contained on them. The ratio of both components and thereby of the indices n and m can, as shown above, be adjusted so that polymers result with different linking abilities. In the case of small m values the polymer respectively its solutions are crosslinking slowly at ambient temperature. Therefore they must quickly be processed. It is advantageous that these products processed to a film are crosslinking and so keep their form. In a further kind of process the active polymer can be reacted so far, that it does not contain any longer remarkably reactive halogen atoms. This polymer can be isolated and does not tend to crosslinking. Crosslinking only begins after mixing with more active polymer not yet reacted. So these two components can be mixed, the solution can be brought to the suitable form where the crosslinking reaction takes place. It is favorable to heat the mixture. Generally a temperature of 80° is sufficient to obtain a reaction within a few hours.

The so reached reaction product dissolved e.g. in methanol can be used to process thin layers of these materials. In these cases the use of microporous supporting materials was very advantageous to produce very thin films. These films are very hydrophilic, therefore they swell in water. Consequently they can be used to separate water in organic solvents by means of pervaporation. Surprisingly it was found that these films can be used for the separation of acidic gases as $CO_2$ or $H_2S$—especially if the films are changed into the carbonate or sulfide form. Hereby the very favorable manufacturing ability allows to produce very thin layers.

The isolated, not crosslinked reaction product can be used as ion conductible adhesives. In an actually known manner bipolar membranes can be produced by bonding cation— and anion exchanging membranes, as it is described e.g. in DE-OS-3508206. In this case, however, there is the advantage that the polymer is strongly basic and is charged in this bipolar membrane and, thus, takes part in the ion transport. Moreover the adhesive is alkaline stable. This is necessary to obtain a durable pasting.

If an isolated not crosslinked reaction product of poly-epichlorhydrin with DABCO is heated, a solid, in water swelling ion exchanger with high fixed ion concentration is obtained. The ion exchanger shows a high alkaline stability and low tendency of oxidation. Due to its low swelling it is especially suitable to standard tasks as the desalination of aqueous solutions. Furthermore an affinity towards sulfate anions can be observed. If this selectivity is not desired, the use of poly-epichlorhydrin-co-ethylenoxide as active polymer is recommended. Anion exchangers on this base material show a much lower affinity toward sulfate.

By adding an inert polymer, the properties of the resulting membranes can be further varied. The use of polyepichlorhydrin or copolymers according to the invention affords the additional possibility to bring inert polymers in the membrane, which could not be used before. Thus, a further variation of membranes is attained because the mechanical properties are essentially determined by the inert component. Useful as inert polymers are those which are soluble in DMF, N-methylpyrrolidone or cyclohexanone such as polysulfone, polyether sulfone, polyvinylidene fluoride, polyvinyl chloride, polymethacryl nitril, polyacryl nitril (PAN) or copolymers of the respective monomers.

It has surprisingly been found that—especially with newly produced polysulfone solutions mixtures can be obtained very well suitable to producing microporous bodies by casting the mixture in the desired form and submerging the form after this. A layer of precipitated polymer is produced at the border to the polymer solution. This layer becomes thicker during several hours or—depending on the deepness of the form—some days and finally fills the form totally. This well known phase inversion leads to a compact solid body swelling in water. Not only thin films can be produced but also solid bodies till a deepness of 3 cm which can be used in the electrophoreses as compact electrolytes or as a solid with a not even profile. In order to be used as a gel body in the electrophoresis it is of great advantage to use poly-(epichlorhydrin-co-ethylenoxid) as active polymer, as this polymer is well suited for the permeation of large anions because of its great intramolecular distances of the fixed ions.

A special possibility of use results from producing burled mats which can be used as spacers in the electrodialysis. Because of their conductibility they possess the property to decrease quite remarkably the electrolytic resistance of the "chamber" and to enable thus a wide desalination. These mats can be optimized by variation of the casting mold so that they satisfy the necessary current conditions in the cell.

These mats can also be produced through evaporation of the casting solution, if a softener is added to the casting solution. The softener has the function to anticipate the swelling degree of the mat. It must not evaporate at the given evaporating conditions and must dissolve in the swelling medium (e.g. water) if the mat is swollen. Thus during the swelling the softener is dissolved and replaced by water. The mat remains unchanged in its form so that profile shaped bodies can be taken out of the casting mold. Therefore all components which are soluble in water and nonvolatile can be used as softeners, especially polyvinyl alcohol, polyethylene glycol and his ethers, polyvinyl pyrrolidone and polyvinyl amide. The necessary additional quantity of a softener has to be fixed experimentally for every casting solution. The same effect can be reached by evaporating only a part of the solvent, which means only as far as the made body does not swell in water.

With PAN, mixtures with polyepichlorhydrin can be made in every ratio. The addition of further primary, secondary or tertiary amines can be of great advantage to increase the fixed ion exchange capacity or to—increase the crosslinking.

Furthermore, films can be obtained by casting or spraying of a solution. If this is processed on a reinforcement such as a asymmetric ultrafiltration membrane, these films can be made very thin. By this way, materials for selective separation layers can be obtained, which can be used e.g. in pervaporation, gas separation, reverse osmosis, dialysis, piezodialysis and so on. At this point, the advantageously possibility of addition of softener in the selective separation material is given. By this way, the profile of properties can be varied furthermore.

A further way of executing the invention are thin mattings, which are coated with thin metal layers on both sides. These mats are produced as described above. Their surface can be flat or provided with a profile. For the application of the metal layer, the ionic conductance of the material can be used by e.g. processing as described in Denki-Kagaku-oyobi-Kogyo-Butsuri-Kagaku, vol. 62(5) 1994 p. 425–433. Such films can be used e.g. as diaphragms in fuel cells. By coating e.g. Nickel, a system can be made, Which allows the electrochemical oxidation of carbon containing fuels, such as methanol. In such an anion exchanging system, the main advantage over cation exchanging systems is given by the possibility of using cheap nickel instead of platinum.

Advantage of these mattings as presented in the invention over common ion exchange membranes is the alkaline stability, which is necessary, because in alkaline fuel cells the transported ions are hydroxide ions and the possibility of evolving a rough surface profile.

BEST MODE OF EXECUTING THE INVENTION

Taking into account the preceding description and without limitation of the invention, the preferred method is executed by adding to a solute of active polymer the amine component, preferably 1,4-diazabicyclo-(2,2,2)-octane as substance or solution, at a mass ratio of reactive polymer to amine of 1:1–2.5, then a solution of inert polymer is added, and subsequently the solution is heated to 50–100° C. until the viscosity of the solution rises considerably. The optimum temperatures and time periods for this step depend on the respective composition and concentration and must be determined experimentally each time. Typical values are however 70–90° C. and 2–12 h. Also the optimum ratio of reactive polymer to amine should be adjusted experimentally. Typical concentrations of used polymer solutions are 10 to 15%. Subsequently, further amine components or further active polymer can be added. The casting solution prepared by this method is the starting product for the producing of the molded bodies.

The preparation of anion exchangers in form of spheres or powder is best done without addition of inert polymer. The solution of reactive polymer is mixed with the amine, this solution is heated as described above until shortly before the point of gelation and this solution is stirred in a known manner in a non-solvent e.g. cyclohexane or paraffin oil with heating. The droplets formed by stirring are hardening by time and can be isolated as ion exchangers.

EXAMPLES

1. A solution A is prepared by dissolution of 20 g polyepichlorhydrin in 80 g DMF. A solution B is prepared by dissolution of 12 g PAN in 88 g DMF. A solution C is prepared by dissolution of 12.25 g 1,4-diazabicyclo-(2,2,2)-octane in 88 g DMF.

1 ml solution A, 5 ml solution B and 1.2 ml solution C are mixed by stirring with a magnetic stirrer and heated to about 80° C. for 30 min.

This solution is cast in a beaker glass to a height of about 10 mm. This is treated some days with wet room air; up to this point, the whole mass has reacted to a yellow cloudy block. This is washed with water until it is free of DMF. It possesses a conductivity of 2 mS/cm.

2. A solution is prepared by mixing 100 ml solution A and 200 ml solution C. This is heated on a oil bath to 100° C. The solution turns first viscous, begins to gelatinize and turns cloudy after some time. The reaction product separates. Afterwards the solution is cooled, the mass isolated and washed with water. It is helpful to swell the mass directly in the vessel with water. An anion exchanger is obtained which can be produced in any size. It shows an ion exchange capacity of about 6 meq/g polymer.

3. A solution A is prepared by dissolution of 10 g polyepichlorhydrin in 90 g DMF. 12.3 g 1,4-diazabicyclo-(2,2,2)-octane are added, stirred and heated to 70° C. until the solution is noticeably more viscous (about 10 h). This solution is cast in acetone and decanted from the precipitated polymer. This is washed several times with acetone and finally dissolved in methanol. This solution is cast as a thin film on a ultrafiltration membrane and the methanol is evaporated. Afterward, this composite membrane is heated in a drying funnel at 75° C. for 3 h.

This membrane shows a separating factor alpha ($CH_4/O_2$)=1.5 with a flux of 0.37 ml/(s bar cm$^2$) $CH_4$. A separating factor alpha ($N_2/O_2$)=1.6 is found.

4. A casting solution as described in example 1 is cast on a polypropylene plate, which has a hexagonal pattern of 1 mm deep holes with a diameter of 3 mm in 6 mm distances. The solution is coated with a layer of water until the produced matting is coagulated. It is isolated afterwards and used as a spacer in a electrodialytic stack.

In a conventional electrodialysis device, such as described e.g. in Chemie-Ing.-Techn. 47 (1975) p. 914 ff, this matting is used instead of the normally used spacer. As concentrate, a 1 N sodium carbonate solution and as diluat, a 0.05 N sodium carbonate solution is used. The concentrate is circulated as known from a normal electrodialysis, the diluat outlet is fitted with a thrush and the product is collected and the conductivity examined.

Applying a current density of 0.17 kA m$^{-2}$ results in a voltage drop of 18 V per repeating unit. The product contains 54 mg/l sodium carbonate at a flux of 480 m$^{-2}$h$^{-1}$.

5. An electrodialysis test as described in example 4 is made with the difference residing in the substitution of the ion conducting spacer by a spacer made of polyester.

Applying a current density of 0.17 kA m$^{-2}$ results in a voltage drop of 24 V per repeating unit. The product contains 108 mg/l sodium carbonate at a flux of 420 m$^{-2}$ h$^{-1}$.

6. A matting, as produced in example 4, is clamped between two chambers separated by this membrane. The first chamber is filled with a 0.1 N solution of $NiCl_2$ the other is filled with a 0.1 N solution of $NaBH_4$. At the side of $NiCl_2$ a gray precipitation of nickel occurs. This procedure is repeated after turning the matting. The result is a matting coated with nickel on both sides.

A platinum mesh is installed as an electrode contact on both sides and is inserted in an apparatus, in which the electrode-ion exchanger-composite can be contacted with a 0.1 N $NaBH_4$ solution. The other electrode works as oxygen cathode driven by air. A mixed potential of 0.72 V is measured between the electrodes.

7. The solution of reacted polymer in methanol as described in example 3 is cast on a cation exchange membrane (type: Neosepta CMX). On this solution, a anion exchange membrane (type: Neosepta AMX) is prepared by rolling. This arrangement is installed in an electrodialysis apparatus as described in DE-OS 3508206 and a current is applied.

Both membranes stick together by the applied current. Applying a current density of 1 kA m$^{-2}$, the resulting bipolar membrane shows a voltage drop of 1.3 V.

I claim:

1. Anion exchanging molded bodies produced from a casting solution of polymers containing reactive halogen-containing functional groups; and tertiary amines by evaporation of the solvent or phase inversion wherein the polymer which contains reactive halogen-containing functional groups is an epichlorohydrin polymer selected from the group consisting of polyepichlorohydrin, epichlorohydrin rubber, epichlorohydrin-ethylene oxide copolymers or terpolymers of epichlorhydrin and the tertiary amine contains at least two tertiary amino groups.

2. Anion exchanging bodies according to claim 1, wherein an inert polymer selected from the group consisting of polysulfone, polyether sulfone, polyvinylidene fluoride, polyvinyl chloride, polymethacryl nitrile, polyacrylnitrile and copolymers of the respective monomers is added to the casting solution.

3. Anion exchanger according to claim 1 wherein the tertiary amine is 1,4-diazabicyclo-(2,2,2)-octane.

4. Anion exchanger according to claim 1, wherein a softener selected from the group consisting of polyvinyl alcohol, polyethylene glycol and its ethers, polyvinyl pyrrolidone and polyvinyl amid is added to the casting solution, which has been washed out after a form giving step.

5. Anion exchanging molded bodies produced from a casting solution of polymers containing reactive halogen-containing functional groups; and tertiary amines by evaporation of the solvent or phase inversion wherein the polymer which contains reactive halogen-containing functional groups is an epichlorohydrin polymer selected from the group consisting of polyepichlorohydrin, epichlorohydrin rubber, epichlorohydrin-ethylene oxide copolymers or terpolymers of epichlorhydrin, and wherein the tertiary amine contains at least two tertiary amine groups, and a softener selected from the group consisting of polyvinylalcohol, polyethyleneglycol and its ethers, polyvinylpyrrolidone and polyvinylamide that was added to the casting solution and subsequently has been washed out after casting.

6. A method for making an anion exchanger according to claim 1 wherein the casting solution is prepared by;

a) reacting said polymer containing reactive halogen containing functional groups with said tertiary amines, in a ratio of 1 part reactive polymer to 1–2.5 parts of tertiary amines b) increasing the viscosity by heating the casting solution to 50–100° C.

c) adding a softener selected from the group consisting of polyvinyl alcohol, polyethylene glycol and its ethers, polyvinyl pyrrolidone and polyvinyl amide, d) pouring the casting solution into form e) removing said softener.

7. Diaphragm for a fuel cell comprising anion exchanging molded bodies of the type produced from a casting solution of polymers containing reactive halogen-containing functional groups; and tertiary amines by evaporation of the solvent or phase inversion wherein the polymer which contains reactive halogen-containing functional groups is an epichlorohydrin polymer selected from the group consisting of polyepichlorohydrin, epichlorohydrin rubber, epichlorohydrin-ethylene oxide copolymers or terpolymers of epichlorhydrin and the tertiary amine contains at least two tertiary amino groups.

8. Selective layer of a membrane of the type selected from the group consisting of a gas separation membrane and a pervaporation membrane comprising anion exchanging molded bodies of the type produced from a casting solution of polymers containing reactive halogen-containing functional groups; and tertiary amines by evaporation of the solvent or phase inversion wherein the polymer which contains reactive halogen-containing functional groups is an epichlorohydrin polymer selected from the group consisting of polyepichlorohydrin, epichlorohydrin rubber, epichlorohydrin-ethylene oxide copolymers or terpolymers of epichlorhydrin and the tertiary amine contains at least two tertiary amino groups.

9. Ion conducting glue for gluing exchange membranes comprising exchanging molded bodies of the type produced from a casting solution of polymers containing reactive halogen-containing functional groups; and tertiary amines by evaporation of the solvent or phase inversion wherein the polymer which contains reactive halogen-containing functional groups is an epichlorohydrin polymer selected from the group consisting of polyepichlorohydrin, epichlorohydrin rubber, epichlorohydrin-ethylene oxide copolymers or terpolymers of epichlorhydrin and the tertiary amine contains at least two tertiary amino groups.

* * * * *